Nov. 12, 1935.  W. L. DOUDEN  2,020,825
SIGNAL VOLTAGE LIMITER
Filed April 17, 1930
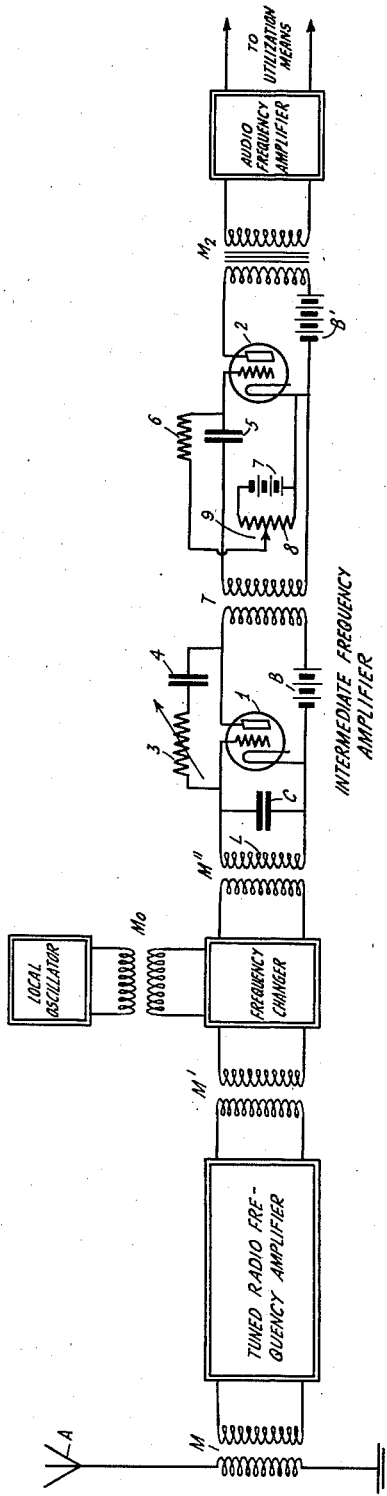
INVENTOR
WILLIAM L. DOUDEN
BY
ATTORNEY Patented Nov. 12, 1935

2,020,825

UNITED STATES PATENT OFFICE 2,020,825

SIGNAL VOLTAGE LIMITER

William L. Douden, Brooklyn, N. Y., assignor to Radio Corporation of America, a corporation of Delaware Application April 17, 1930, Serial No. 444,968

7 Claims. (Cl. 250—20)

My present invention relates to signalling arrangements, and more particularly to signal voltage limiting devices adapted for use in such arrangements.

It is extremely desirable to utilize devices, in a signalling system, the primary function of which is to limit the sensitivity of the system to predetermined maximum and/or minimum signal voltage values. For example, in operating a receiving circuit in the design of which sensitivity has been stressed, it is quite apparent that the reception of signals from strong local broadcasting stations, and the existence of a background noise level, presents a disturbing, and often annoying, problem to the receiver operator. Again, a similar situation exists in receivers of relatively greater selectivity and somewhat lesser sensitivity. To illustrate, the highly sensitive superheterodyne receiver possesses sufficient sensitivity to amplify background noises, and faint undesired signals from distant points, to an annoying extent. Obviously, the strong signal from a local broadcasting station presents the same objection, in this case, as in the less selective receiver.

Automatic gain control has been resorted to in an effort to solve the problem of the strong local signal. But, it is readily realized that this type of control may be inadequate, for it depends on regulation by carrier frequency intensity to eliminate background noises, since the latter are greatly intensified when a faint carrier frequency, or none at all, is being detected.

Now, I have devised a method of, and means for, controlling the operation of a signalling system, such as a receiving circuit, the method of control functioning to provide two limits beyond which the system does not respond thereby determining the maximum intensity of signal to be detected, and, additionally, definitely establishing a minimum intensity of signal which will operate the detecter.

Accordingly, it is one of the main objects of my invention to provide a method of, and means for, limiting to predetermined maximum and/or minimum intensity values, the signal voltage to be detected by a high frequency receiving circuit.

Another important object of the invention is to provide in a superheterodyne receiver including an amplifier of super-audible beat frequencies and a detector, means associated with the amplifier to limit the signal fed to the detector to a predetermined maximum intensity, and additional means associated with the detector to limit the operation of the latter to electrical impulses above a predetermined minimum intensity value.

Another object of the invention is to provide, in a receiving circuit, a detector provided with means for limiting its operation to electrical impulses above a predetermined minimum intensity value whereby background noises and faint signals below this value are rendered substantially inaudible, the latter result being particularly advantageous while tuning the circuit through portions of the broadcasting range containing signals of intensities which are too faint for the said circuit.

Still other objects of the invention are to improve the efficiency of receiving systems in general, and to provide a circuit in particular, which is not only reliable in operation, and free of undesirable characteristics, but economically provided with the devised improvement.

The novel features which I believe to be characteristic of my invention are set forth in particularity in the appended claims, the invention itself, however, as to both its organization and method of operation will best be understood by reference to the following description taken in connection with the drawing in which I have indicated diagrammatically one circuit arrangement whereby my invention may be carried into effect.

Referring to the figure in the drawing, a superheterodyne receiving circuit is diagrammatically shown embodying one form of the invention, the circuit including means A, G for collecting signal energy, and other electrical impulses. The collecting means is coupled, as at M, to a tuned radio frequency amplifier, the latter being conventionally shown since any type, well known to those skilled in the art, may be utilized.

The amplified radio frequency energy is transmitted to a frequency changer, through a coupling M', the radio frequency energy being heterodyne in the frequency changer with energy from a local oscillator, supplied through the coupling $M_0$. As is well known to those skilled in the art, the beat frequency is superaudible, and is designated as the intermediate frequency. The latter is transmitted, through a coupling M'', to the intermediate frequency amplifier, the amplifier being fixedly tuned by the coil L and capacity C to the intermediate frequency.

While I have shown the intermediate amplifier as including only a single electron discharge device I, it is to be understood that a plurality of such devices may be employed to increase amplification. The anode of the device I receives potential from a source B, through the primary coil of the coupling transformer T. The amplified intermediate frequency is detected by a subsequent detector stage, the latter including the electron discharge device 2.

Potential is supplied to the anode of device 2, from a source B', control electrode detection being employed by connecting a capacity 5 in series with the control electrode, and shunting a leak resistor 6 across the capacity. The output of the device 2 is transmitted to an audio frequency amplifier, of any desired type, through an audio transformer coupling M2, and the amplified audio energy utilized in any desired manner, as by head phones, loud speaker and the like.

In order to limit the operation of the intermediate amplifier to electrical impulses below a predetermined maximum intensity value, a path, including a capacity 4 and resistance 3, is connected between the anode and control electrode of the device 1. This path, which may be expressed as a regulating, limiting or controlling means, feeds energy from the anode circuit to the control electrode circuit, in phase opposition to the input energy, thereby constantly exercising a limiting action on the amplified output voltage.

The relation between output and input voltage of device 1 is only linear for a portion of the input voltage increase, and, thereafter, for increases of input voltage no further increase of output occurs. On the other hand, as the relation between the input voltage and the voltage fed back along path 3, 4 is a linear one for all values of input voltage, it will be readily appreciated that there exists a certain value of input voltage beyond which further increase of input voltage results in a decrease of output voltage. This necessarily results because of the fact, as stated heretofore, that the voltage in the anode circuit of the device 1 is in phase opposition to the voltage in the control electrode circuit of the device 1.

It is, therefore, seen that the resultant output voltage is secured by subtracting, for all values of input voltage, the output energy fed back along path 3, 4 from the normal value of output voltage at any given input voltage value. By making the resistor 3 adjustable, the value of the limiting maximum intensity can be varied. In this way, the operation of the intermediate frequency amplifier is controlled so that the electrical energy fed to the detector cannot exceed a predetermined maximum intensity value. Obviously, one important advantage of a limiting arrangement is in connection with local reception, it being possible to limit the intensity of local signals to a desired maximum value, thereby eliminating blasting and similar objections.

To limit the detecting action of the device 2 and its associated circuits, a source of biasing potential 7 is connected to the control electrode of the device 2 so as to constantly maintain a predetermined, negative biasing potential on the said control electrode. This is accomplished by connecting the negative terminal of the source 7 to one terminal of a potentiometer resistor 8, and connecting the positive terminal of the biasing source to the other terminal of the resistor, the positive terminal being, also, connected to the lead of the cathode of device 2. A sliding contact member 9 is arranged for sliding contact with the resistor 8, and is, additionally, connected to one terminal of the leak resistor 6.

Thus, it will be seen that the control electrode can be normally biased to any desired negative potential by adjusting the sliding contact 9. In this way, a limiting minimum intensity value is readily established for the detector operation. As a consequence, electrical impulses, whether faint signals or background noises, having an intensity below this aforementioned minimum limiting value, will not be detected, and subsequently be rendered inaudible to the listener. For signals just audible, a slight increase in the grid bias on the control electrode of device 2 renders the signals inaudible, and if the grid bias is increased sufficiently everything, except the high power local stations, disappears completely.

There is a certain value of bias at which the background noise is substantially inaudible but even an extremely faint signal comes through rather clearly; below this value of grid bias an appreciable increase in background noise occurs without any appreciable increase in the apparent sensitivity of the set to broadcast signals. It may be pointed out that the value of the leak resistor 6 is chosen so that at the critical point, above referred to where the background noise is just eliminated, the limiting arrangement operates efficiently to perform the latter function.

It will, thus, be seen that the arrangement disclosed herein, makes it possible to definitely establish, in a predetermined manner, limits beyond which the detector will not be called upon to operate, and below which the electrical impulses collected will not operate the detector, the signal intensity between these limits being regulated in any desired manner. For example, the usual automatic volume control can be employed between these limits so as to maintain a uniform intensity level. It is readily noted that the operation of an automatic volume control arrangement, in connection with a receiving circuit, is greatly enhanced with the addition of the improvements disclosed herein.

Again, it is pointed out that the invention is not limited to a superheterodyne receiving circuit, but the limiting arrangements disclosed may be employed on any well known type of non-heterodyne tuned radio frequency receiver. Furthermore, electron discharge devices, other than triodes, may be employed in place of the devices 1, 2, such devices being, for example, screen grid tubes. Again, it is to be understood that the path 3, 4 can be connected between the control electrode of the device 1 and the high potential end of the secondary coil of coupling means T, it being necessary in such a case to insure feedback of energy in phase opposition to the input energy of the device 1, the latter being accomplished in any manner well known to those skilled in the art. Limitation of output of the amplifier may also be produced by limiting the electron emission of the cathode of the amplifier.

While I have indicated and described one arrangement for carrying my invention into effect, it will be apparent to one skilled in the art that my invention is by no means limited to the particular organization shown and described, but that many modifications may be made without departing from the scope of my invention as set forth in the appended claims.

What I claim is:

1. A superheterodyne receiver comprising an intermediate frequency amplifier, a succeeding detector, means associated with the amplifier to limit the signal fed to the detector below a predetermined maximum intensity level to prevent blasting, and means associated with the detector and electrically independent of said first means to limit the operation of the detector to electrical signal impulses above a predetermined minimum value whereby faint signals and background noises below the said value are not detected.

2. A high frequency receiving circuit comprising an amplifier and a detector having means associated with the amplifier to limit the signal fed to the detector below a predetermined maximum intensity to prevent blasting, and means associated with the detector and electrically independent of said first means to limit the operation of the detector to electrical signal impulses above a predetermined minimum value, said second means consisting of a self-biasing means associated with the detector grid, and means for applying a predetermined biasing potential to said grid.

3. In a superheterodyne receiver, an intermediate frequency amplifier, a second detector tube provided with an input and output circuit, means for establishing a limiting minimum signal intensity value for the detector operation comprising a source of biasing potential connected to the grid of the tube, an impedance in shunt with said source, the positive terminal of said source being connected to the tube cathode, a capacity in series in the grid circuit, and a grid leak resistor connected in shunt with the capacity and between said grid and a desired point on said impedance.

4. A method of receiving broadcast signals with a tunable radio receiver having an amplifier and detector which consists in collecting broadcast signals of a desired frequency, amplifying said collected signals, automatically regulating the amplification to prevent the input to the detector from increasing above a predetermined maximum signal intensity value, detecting the amplified signals, and rendering the detection inefficient without effect on said amplification regulation when the receiver is tuned through a portion of the broadcast range where signal energy below a predetermined intensity value is collected.

5. In combination with a radio receiver provided with automatic volume control means for maintaining the signal input to the detector less than a predetermined intensity value, means electrically independent of said control means for normally biasing the grid of the detector negative with respect to the cathode, said negative bias being of a magnitude such that the detector is rendered inoperative to detect undesired background noises when the desired signal energy decreases below a predetermined intensity level without affecting the operation of said control means, and additional means for adjusting the magnitude of said bias whereby the background noise level may be controlled.

6. In combination with a radio receiver which is provided with a signal amplifier having tuning means, a signal detector adapted to feed a reproducer, and automatic volume control means for maintaining the signal amplitude at the detector input less than a predetermined amplifier signal input amplitude, means for applying a normal bias to the detector of such magnitude that the detector is rendered inoperative to detect undesired background noises when the signal amplitude decreases below a predetermined value, whereby said noises are not reproduced when the tuning means is adjusted through a portion of the tuning range where signals below said amplitude value are collected, said applying means being electrically independent of the volume control means whereby the operation of the latter is unaffected by changes in the detector operation.

7. In a radio receiver of the type defined in claim 6, said bias applying means being adjustable to vary the magnitude of the said bias.

WILLIAM L. DOUDEN.